(12) United States Patent
Fandrey et al.

(10) Patent No.: US 7,980,481 B2
(45) Date of Patent: Jul. 19, 2011

(54) THERMALLY CONTROLLED PROCESS INTERFACE

(75) Inventors: Mark C. Fandrey, Eden Prairie, MN (US); Scott D. Nelson, Plymouth, MN (US); Michelle A. Fandrey, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 1311 days.

(21) Appl. No.: 11/006,950

(22) Filed: Dec. 8, 2004

(65) Prior Publication Data

US 2006/0122739 A1 Jun. 8, 2006

(51) Int. Cl.
*G05D 15/00* (2006.01)
*F16L 3/00* (2006.01)
*G05D 23/00* (2006.01)

(52) U.S. Cl. ............................ 236/85; 137/343; 700/300

(58) Field of Classification Search ............... 236/85; 700/300; 137/343
See application file for complete search history.

(56) References Cited

U.S. PATENT DOCUMENTS

| | | | |
|---|---|---|---|
| 4,738,276 A * | 4/1988 | Adams | 137/343 |
| 5,481,968 A * | 1/1996 | Clem | 99/452 |
| 5,526,685 A | 6/1996 | Davis | 73/262 |
| 5,868,159 A * | 2/1999 | Loan et al. | 137/334 |
| 5,932,332 A | 8/1999 | Pandorf et al. | 428/220 |
| 6,295,875 B1 * | 10/2001 | Frick et al. | 73/718 |
| 6,510,740 B1 | 1/2003 | Behm et al. | 73/708 |
| 6,578,596 B1 * | 6/2003 | Batchelder et al. | 137/15.09 |
| 6,591,696 B2 | 7/2003 | Bachinski | 73/861.65 |
| 6,681,623 B2 | 1/2004 | Bonne et al. | 73/202 |
| 6,752,165 B2 * | 6/2004 | Johansson | 137/4 |
| 6,790,034 B1 * | 9/2004 | Kearns et al. | 432/37 |
| 2003/0221491 A1 | 12/2003 | Albert et al. | 73/724 |
| 2003/0234048 A1 * | 12/2003 | Shajii et al. | 137/487.5 |
| 2005/0115945 A1 * | 6/2005 | Kesteren et al. | 219/390 |

FOREIGN PATENT DOCUMENTS

| | | |
|---|---|---|
| GB | 1219710 | 1/1971 |
| JP | 55055216 | 4/1980 |

OTHER PUBLICATIONS

Copy of the International Search Report and Written Opinion from application No. PCT/US2005/041871, filed Nov. 18, 2005.
Setra, "Heated 700 Series Vacuum Pressure Transducers Models 764/769/774," http://www.setra.com/tra/pro/p_ul_700.htm, Jul. 9, 2004.
Communication issued for counterpart European Patent Application 05 84 9149.9, filed Nov. 18, 2005.

(Continued)

*Primary Examiner* — Chen-Wen Jiang
(74) *Attorney, Agent, or Firm* — Christopher R. Christenson; Westman, Champlin & Kelly, P.A.

(57) ABSTRACT

A field device is coupled to a process through at least one process interface element. The process interface element may be a field device flange, a manifold, or a process flange. The process interface element has a temperature sensor attached thereto, and is adapted to receive a thermal source. In one embodiment, the thermal source is one or more electrical heaters. In another embodiment, the thermal source is thermal transfer fluid tracing through the process interface element. A controller is coupled to the temperature sensor and is adapted to control the heat applied to the process interface element based upon the temperature of the process interface element measured by the temperature sensor.

17 Claims, 8 Drawing Sheets

OTHER PUBLICATIONS

First Office Action for Chinese patent application 200580041658.6, filed Nov. 18, 2005.
Official Action from Russian patent application 2007125650, filed Nov. 18, 2005.
Second Office Action from Chinese patent application No. 200580041658.6, dated May 8, 2009.
Office Communication from European patent application No. 05 849 149.9-2206, dated May 3, 2010.
Rejection Decision from Chinese patent application No. 200580041658.6, dated May 5, 2010.
First Office Action from the Japanese patent application No. 2007-545496 dated Nov. 24, 2010.
First Examination Report from Indian patent application No. 3018/CHENP/2007 dated Dec. 28, 2010.
Communication from European patent application No. 05849149.9 dated May 11, 2011.

* cited by examiner

THERMALLY CONTROLLED PROCESS INTERFACE

BACKGROUND OF THE INVENTION

The present invention relates to field devices. More particularly, the present invention relates to process interfaces between the field device and the process.

Field devices, such as process variable transmitters, are used by a number of industries to remotely sense a process variable. Such variables are generally associated with fluids such as slurries, liquids, vapors, gases, chemicals, pulp, petroleum, pharmaceuticals, food, and other fluid processing plants. Process variables may include pressure, temperature, flow, turbidity, density, concentration, chemical compensation, and other properties. Other examples of field devices include valves, actuators, heaters, and controllers.

Process variable transmitters are used to measure and provide accurate and reliable process measurements. One of the challenges in making accurate and reliable process measurements is maintaining the integrity of the process interface and the process medium itself. It is common for the process fluid to clog or solidify due to changing temperatures or changes in the state of the fluid itself leading to erroneous measurements and potentially unsafe process conditions.

The use of thermal control systems in industrial process control and measurement is known. For example, high purity vacuum transducers often have an internal thermal control system to maintain the entire device at a selected temperature in order to increase accuracy and/or longevity of the device. Additionally, some field devices employ a thermal control system disposed proximate a primary element in order to ensure that the element is maintained at a desired temperature. For example, it is known for pitot tubes to be heated such that they do not accumulate ice in measuring air velocity during flight.

Additionally, some have employed a number of external means and methods to apply thermal control systems to field devices. These techniques generally employ electrical heat elements or steam tracing but are difficult to install, have poor temperature measurement and control, and are costly and troublesome to maintain. These devices are "add-on designs" designs that are typically attached externally to the connection hardware or measurement instrument itself. While prior approaches have generally addressed some thermal issues of the instrument modules and primary elements themselves, the process interface element has not been utilized for such uses. Installations with thermal control elements added-on to the process interface element require additional control systems, additional installation time and expense. Further, such systems are more susceptible to failure since they are exposed to the elements. Thus, there is a need for field devices having process interface elements with more integral thermal control systems. Such field devices would provide the advantages of thermal control of the process interface less expensively and more robustly.

SUMMARY OF THE INVENTION

A field device is coupled to a process through at least one process interface element. The process interface element may be a field device flange, a manifold, impulse tubing or a process flange. The process interface element has a temperature sensor attached thereto, and is adapted to receive a thermal source. In one embodiment, the source is one or more electrical heaters. In another embodiment, the thermal source is heat transfer fluid tracing through the process interface element. A controller is coupled to the temperature sensor and is adapted to control the heat applied to the process interface element based upon the temperature of the process interface element measured by the temperature sensor.

DETAILED DESCRIPTION OF THE PREFERRED EMBODIMENTS

In the following description, reference is made to the accompanying and drawings. The drawings and description provide specific examples, or "embodiments," of how the invention may be made or used, or "practiced." The scope of the invention includes these specific examples, and other examples, and should not be limited to the examples described here. Other examples are contemplated and will fall within the scope of the invention even if they are developed after the disclosed examples. Changes can be made to the described embodiments without departing from the spirit of the scope of the protected invention, which is defined by the appended claims.

Figure 1:
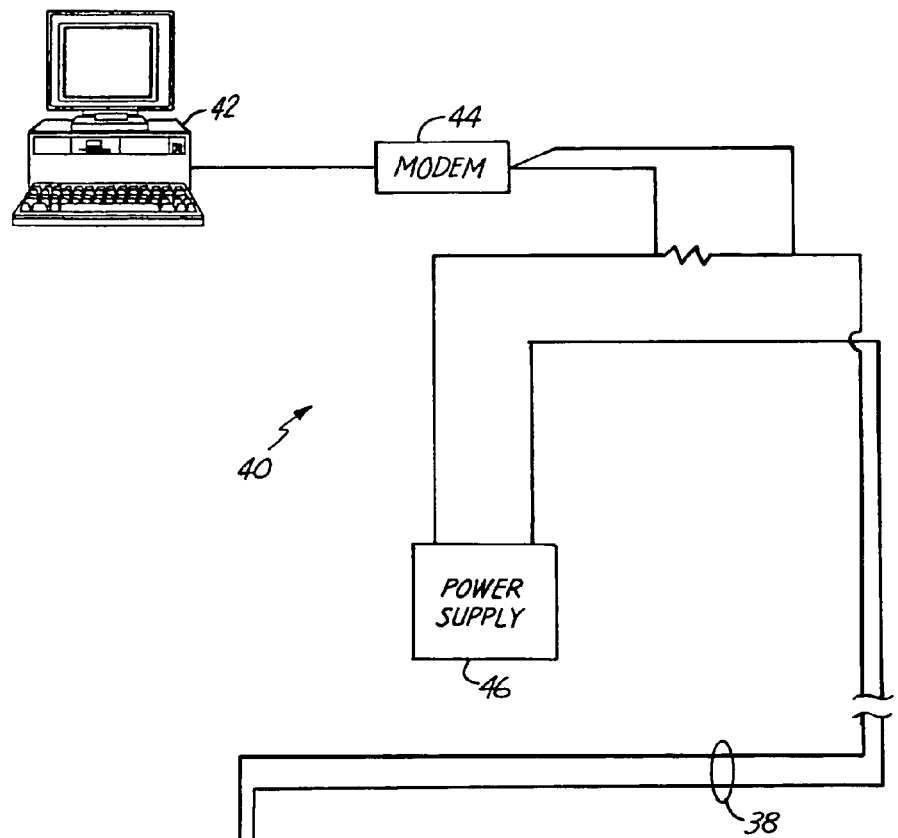
FIG. 1 is a diagrammatic view of an environment of a process measurement system.
Figure 1:
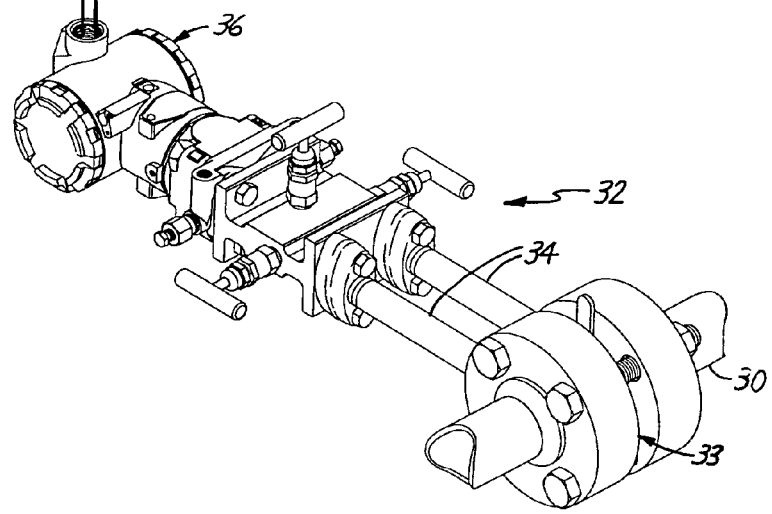

FIG. 1 shows generally one example of an environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses the process pressures and converts it to a standardized transmission signal that is a function of the process pressure. Transmitters can also sense multiple process variables or can be configured to provide process control functions. In the example, transmitter 36 is a differential pressure transmitter. FIG. 1 shows the transmitter configured to measure flow. Other uses of the transmitter for differential pressure measurement are, of course, contemplated.

A process loop 38 facilitates both a power signal to the transmitters 36 and bi-directional communication, and can be constructed in accordance with a number of process communication protocols. In the illustrated example, the process loop 38 is a two-wire loop. A two-wire loop, as the name implies, uses only two wires to electrically connect the transmitter 36 to a remote control room 40. The two-wire loop is used to transmit all power to and all communications to and from the transmitter 36 during normal operations with a 4-20 mA signal. Accordingly, the transmitter 36 as illustrated often is referred to as a "two-wire transmitter," although other configurations, such as three-wire and four-wire transmitters, and so on, are known and contemplated. Communication can be performed with a 4-20 mA analog signal, and the open protocol HART® or FOUNDATION™ Fieldbus digital protocol. The transmitter 36 can be configured for use with other process protocols, including Device Bus, Sensor Bus, Profibus, Ethernet, and others in use throughout the world. A computer 42 or other information handling system, through modem 44 or other network interface, is used for communication with the transmitter 36. A remote voltage power supply 46 typically powers the transmitter 36.

Figure 2:
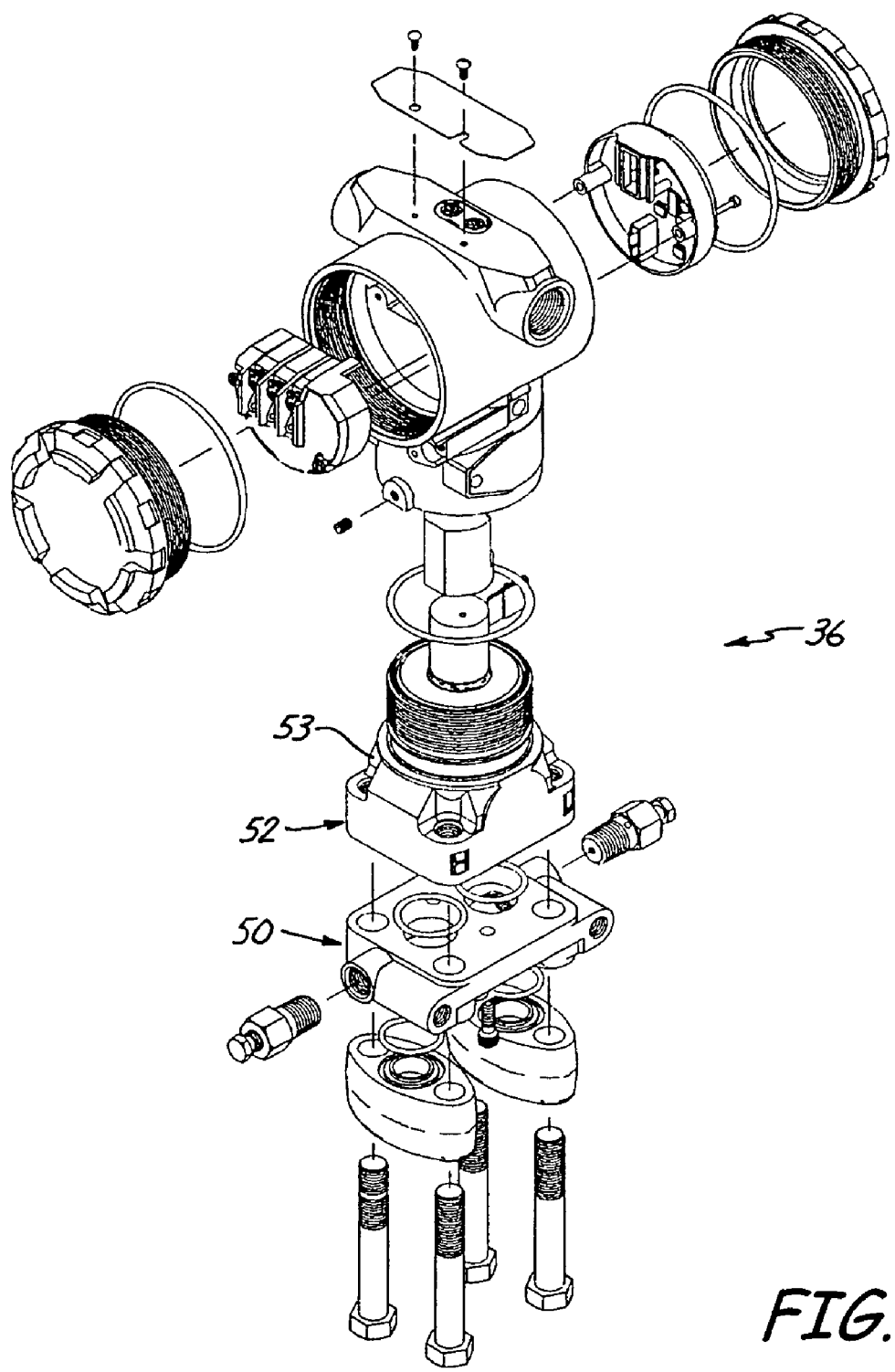
FIG. 2 is an exploded view of an exemplary process variable transmitter.

FIG. 2 shows an exploded view of the example transmitter 36. Field device flange 50 is attached to a sensor module 52 to interface with impulse piping 34. The sensor module 52 includes a threaded housing 53 that is an all welded design to isolate internal components from the process medium and the field environment. A process pressure is applied to the sensor module 52. A pressure sensor (not shown) disposed within module 52, isolated mechanically, electrically, and thermally from the process medium receives the process pressures and provides an analog electrical signal representative of differential pressures.

Figure 3:
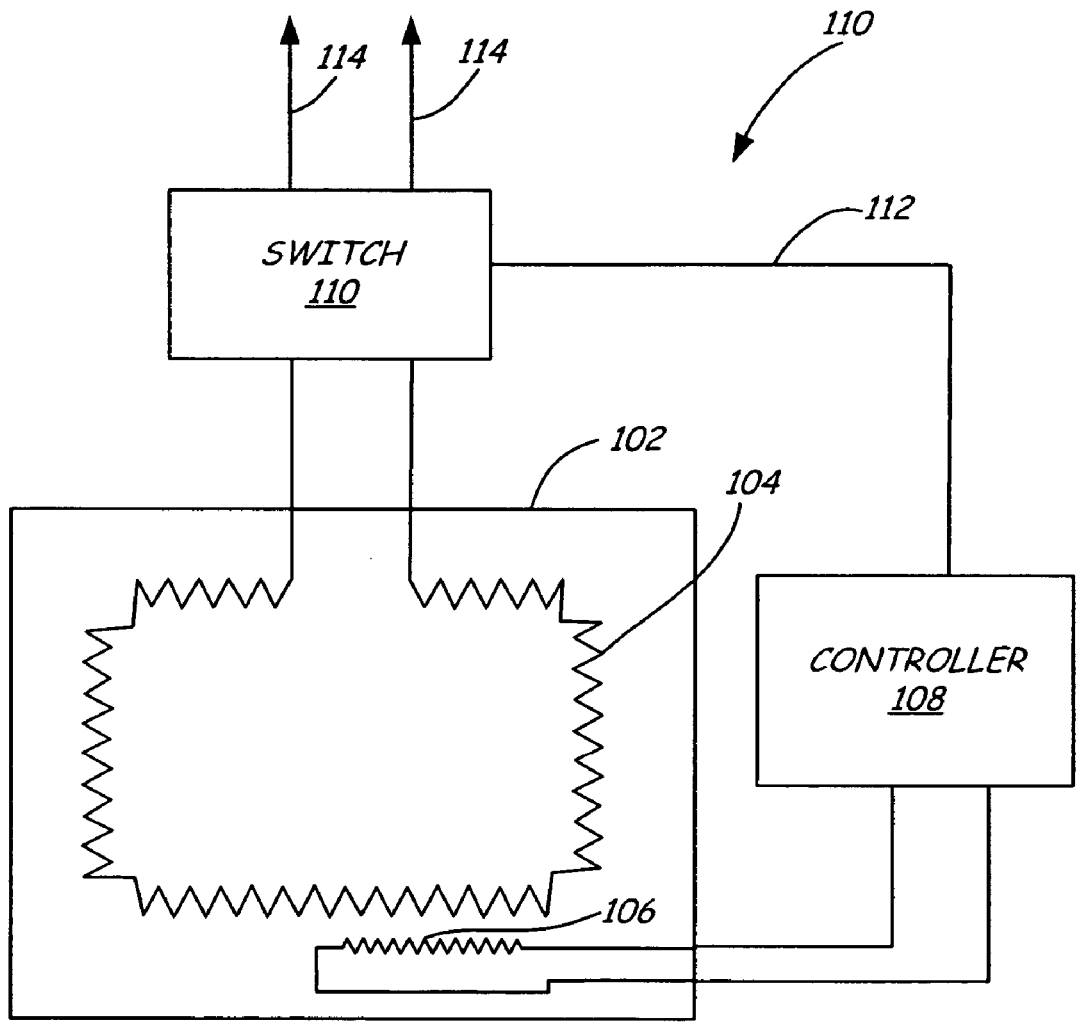
FIG. 3 is a diagrammatic view of a process interface thermal control system in accordance with an embodiment of the present invention.

FIG. 3 is a diagrammatic view of one embodiment of the present invention. System 100 includes a process interface element 102 having an electrical heating element 104 disposed therein and thermally coupled thereto. A temperature sensitive device 106 is thermally coupled to process interface element 102 and electrically coupled to controller 108. Controller 108 is further coupled to electrical switch 110 via control line 112.

Process interface element 102 may be any interface element that couples, at least in part, a process device to the process. Process interface elements include, but are not limited to, a manifold, a process flange, impulse piping, a secondary fill system (such as a remote seal) and/or a field device flange. Switch 110 is coupled to a source of electrical power via lines 114 and can selectively pass power to thermal source 104 based upon energization of control line 112 from controller 108. Thermal source 104 can be any electric device which can change temperature in response to energization. Thus, source 104 can be an electric heater, or a device that cools in response to energization, such as a known Peltier device. Preferably, source 104 is an electric heating element configuration that is suitable for use with a process interface element. For example, source 104 may include one or more cartridge heaters disposed within suitable recesses inside process interface element 102. Additionally, other types of electrical heaters, such as etched-foil heaters could be incorporated into the design and manufacture of process interface element 102. Those skilled in the art will recognize other forms of electrical heating that may be suitable for heating process interface element 102.

Temperature sensor 106 can be any suitable device that provides an electrical parameter that varies with the temperature of process interface element 102. Accordingly, sensor 106 may be a thermocouple, a resistance temperature device (RTD), a thermistor, or any other suitable device. Preferably, sensor 106 is disposed within process interface element 102. One example of sensor 106 being disposed within process interface element 102 includes sensor 106 being a RTD probe disposed within a suitably sized recess within process interface element 102.

Controller 108 includes logic and/or circuitry that can relate a suitable control signal provided on line 112 to a temperature sensor signal provided from temperature sensor 106 using a suitable control strategy. Controller 108 preferably includes a microprocessor as well as suitable input and output circuitry for receiving the input signal and for generating the output signal. For example, where temperature sensor 106 is an RTD, controller 108 may include suitable circuitry to drive a small current through the RTD and measure an associated voltage developed across the RTD. In one embodiment, controller 108 may be the controller of the field device to which the thermal control system 100 is coupled. For example, in embodiments where the process variable transmitter is a pressure transmitter having a microprocessor therein, controller 108 may be provided by the microprocessor within the process variable transmitter. However, in other embodiments, both controller 108 and switch 110 may be an additional add-on module for maintaining independent temperature control of the process interface element 102. In other embodiments, this controller 108 and switch 110 may be integral with the process interface element 102.

Figure 4:
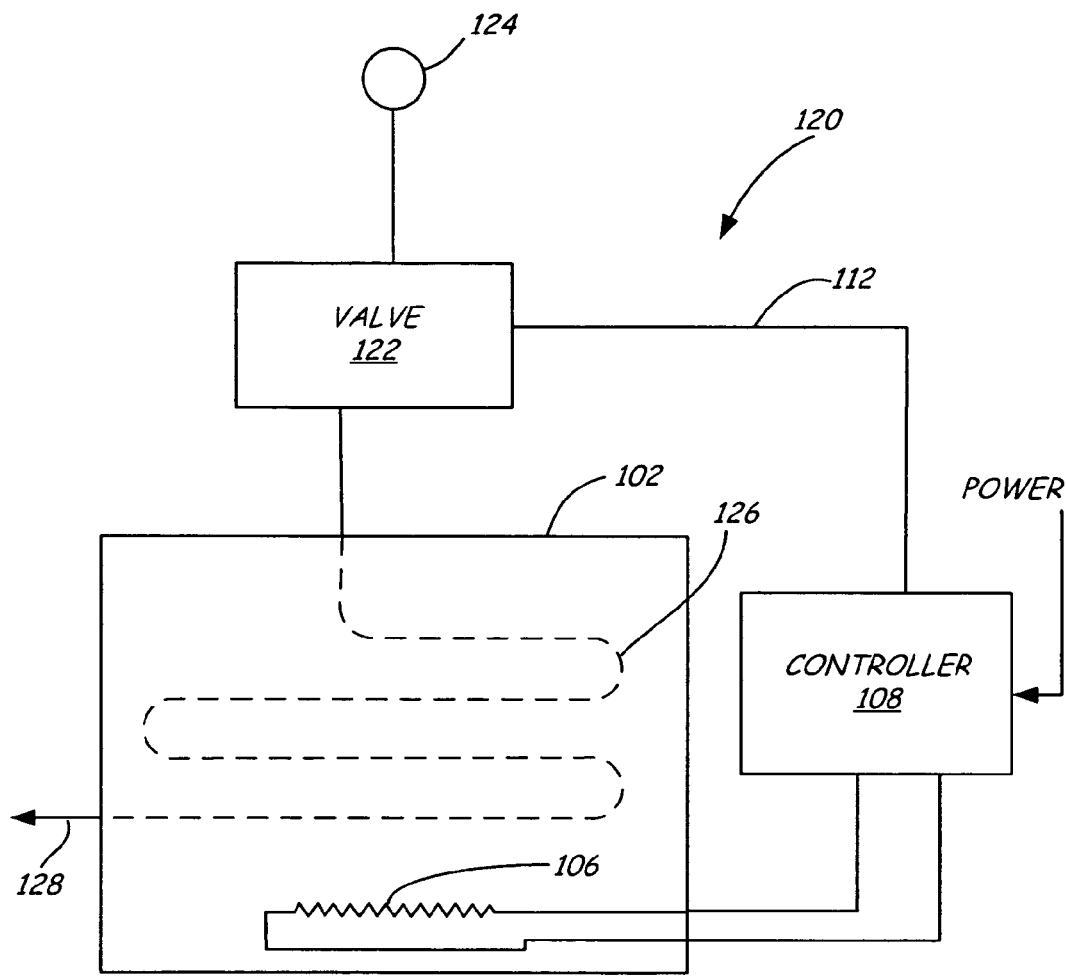
FIG. 4 is a diagrammatic view of a process interface thermal control system in accordance with another embodiment of the present invention.

FIG. 4 is a diagrammatic view of process interface thermal control system 120 in accordance with an embodiment of the present invention. Control system 120 includes a number of components similar to control system 100, and like components are numbered similarly. Control system 120 differs from control system 100 in that control system 120 uses a thermal transfer fluid, such as steam, to control the temperature of process interface element 102. Accordingly, switch 110 of system 100 is replaced by valve 122 in system 120. Valve 122 is coupled to source 124 of thermal transfer fluid. Valve 122 selectively allows the thermal transfer fluid to flow through tracing 126 in process interface element 102 based upon energization of line 112 from controller 108. The heat transfer fluid exiting process interface element 102 is indicated at reference numeral 128 and may be used for additional components, such as other process interface elements, may be drained, or may be recovered. As before, sensor 106 provides an indication of the temperature of process interface element 102 to controller 108 which selectively energizes valve 122 along line 112 to control the flow of thermal transfer fluid and thus control the temperature of process interface element 102. Depending on the temperature of the thermal transfer fluid relative to the process interface, flow of fluid through the process interface may heat or cool the process interface.

Figure 5:
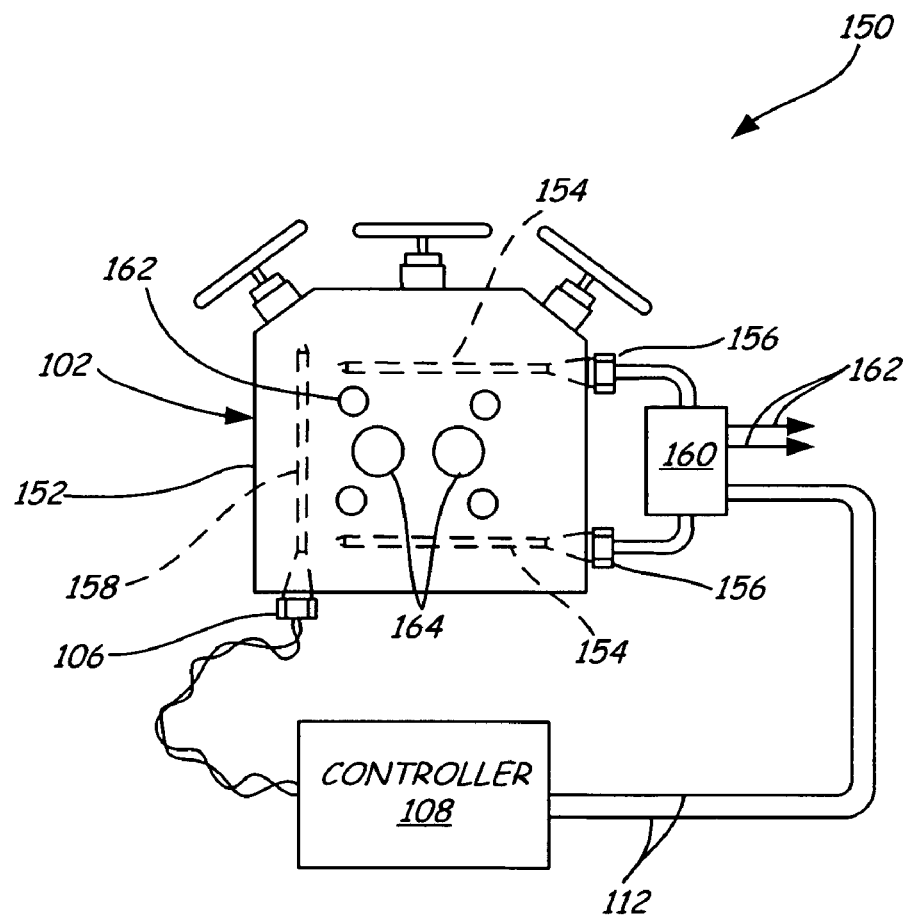
FIG. 5 is a diagrammatic view of a process interface thermal control system in accordance with another embodiment of the present invention.

FIG. 5 is a diagrammatic view of process interface thermal control system 150. System 150 includes process interface element 102, which in this embodiment is a manifold 152 having a plurality of recesses 154 therein to receive cartridge heaters 156. Manifold 152 also has a recess 158 which receives temperature sensor 106. Switch 160 is coupled to a source of power via lines 162 and selectively energizes cartridge heaters 156 with power from lines 162 based upon energization of control lines 112 from controller 108. Switch 160 may be any suitable device able to switch a relatively large amount of power based upon a relatively smaller energization signal. For example, switch 160 may be a relay, a semiconductor switch, or any other suitable device. Manifold 152 includes mounting holes 162 and pressure conduits 164.

Thermal control system 150 allows the manifold 152 to be maintained at a selected temperature set point stored in controller 108. Accordingly, if sensor 106 indicates that the actual temperature of manifold 152 is below the set point, controller 108 will energize switch 160 along lines 112 in order to heat manifold 152 using cartridge heaters 156. Any suitable control regime can be used including, but not limited to, proportional, proportional-integral, proportional-derivative, and proportional-integral-derivative (PID).

Figure 6:
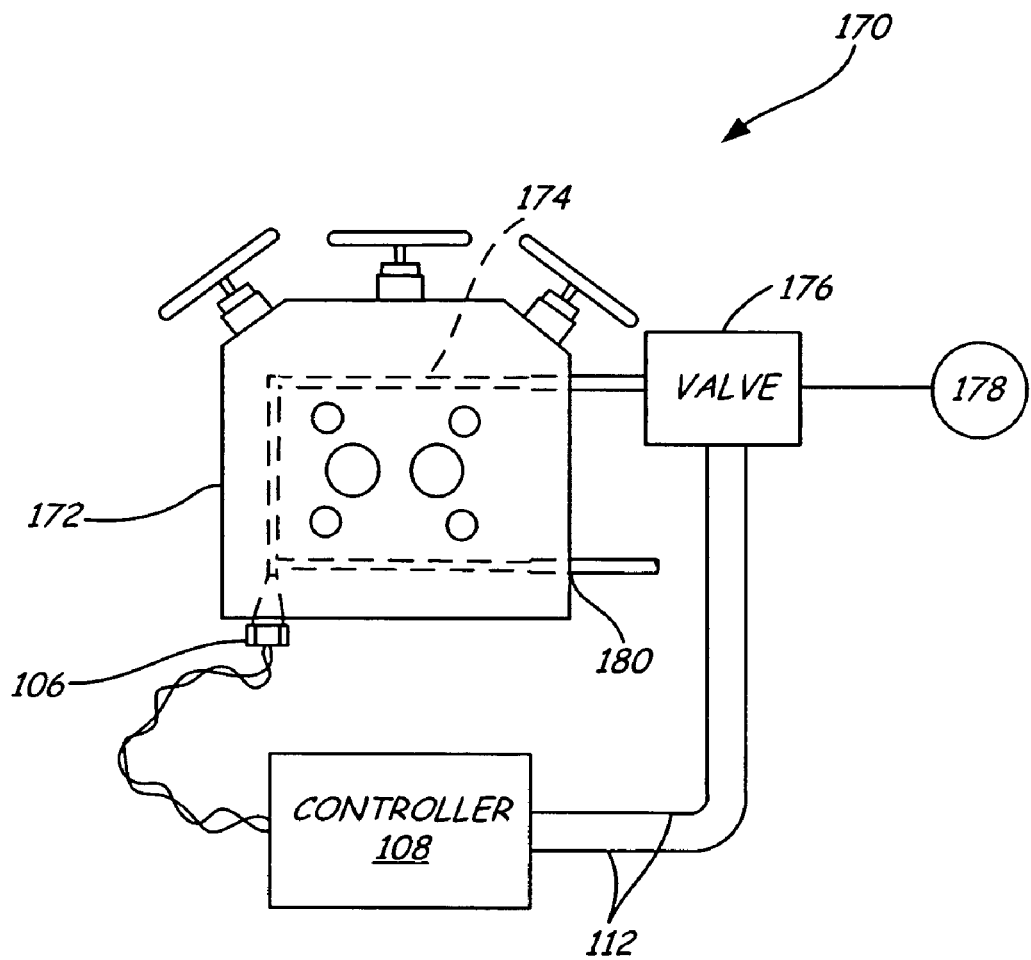
FIG. 6 is a diagrammatic view of a process interface thermal control system in accordance with another embodiment of the present invention.

FIG. 6 is a diagrammatic view of process interface thermal control system 170 in accordance with another embodiment of the present invention. Manifold 172 of system 170 is similar to manifold 152, but includes thermal transfer fluid tracing 174 therein. Valve 176 is coupled to a source 178 of heat transfer fluid and selectively allows thermal transfer fluid to flow through tracing 174 and out port 180 based upon energization of control line(s) 112 from controller 108. As described in other embodiments, controller 108 generates the energization signal along lines 112 based upon the temperature measured by temperature sensor 106. As indicated in FIG. 6, temperature sensor 106 is preferably disposed relatively close to the thermal transfer fluid tracing 174. In the embodiment shown in FIG. 6, sensor 106 is actually disposed slightly above or below thermal transfer fluid tracing 174. Preferably, the thermal transfer fluid is steam, but may be any suitable fluid including liquids such as water, oil, or anti-freeze.

Figure 7:
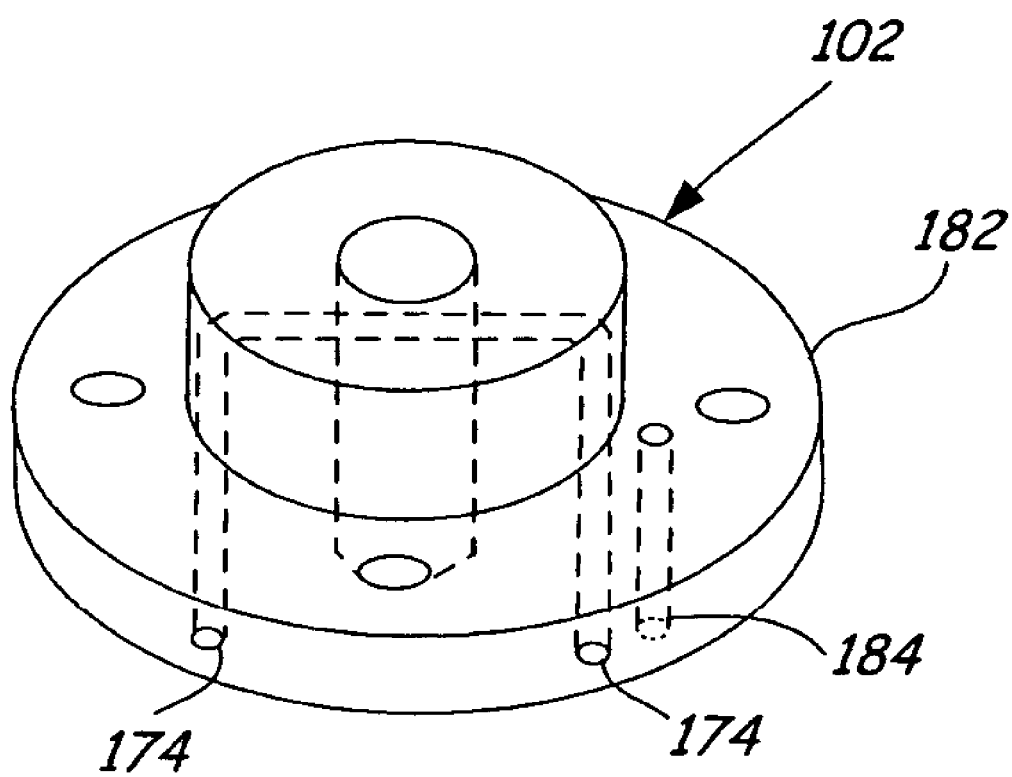
FIG. 7 is a diagrammatic view of another type of process interface element in accordance with an embodiment of the present invention.

FIG. 7 is a diagrammatic view of another type of process interface element 102. In this embodiment, process interface element 102 is a flange, such as a process or field device flange 182. Flange 182 includes thermal transfer fluid tracing 174 and a hole 184 disposed relatively close to the thermal transfer fluid tracing 174. Hole 184 is suitable for mounting a temperature sensor, such as temperature sensor 106.

Figure 8:
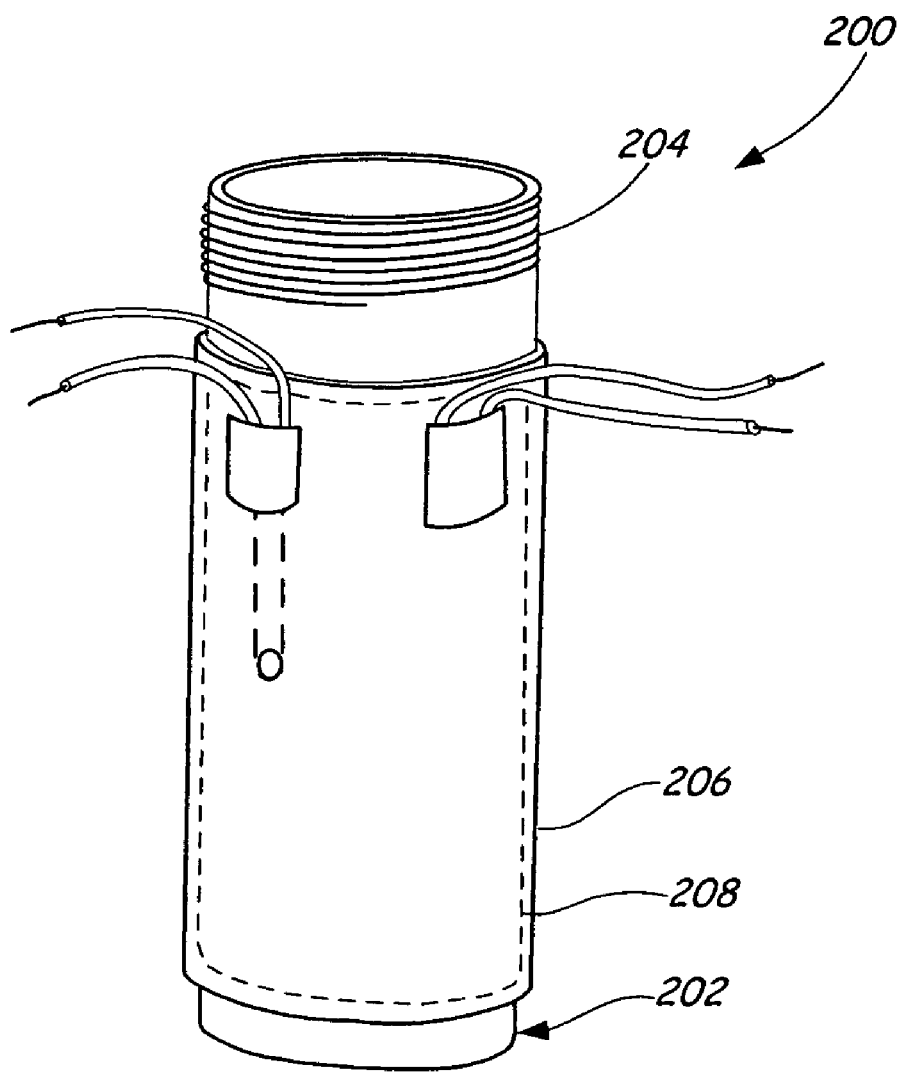
FIG. 8 is a diagrammatic view of another type of process interface element in accordance with an embodiment of the present invention.

FIG. 8 is a perspective view of a process interface element 200 in accordance with an embodiment of the present invention. Element 200 is a conduit that transmits a process pressure from the process, via a fluid within the conduit, to a pressure sensing device. One form of element 200 includes a modified impulse pipe 202. However, element 200 can also be a secondary fill system such as a remote seal. Impulse pipe 202 includes threads 204 for coupling to a process variable transmitter. Additionally, impulse pipe 202 has a thermal source 206 thermally coupled thereto. In the illustrated embodiment, thermal source 206 is an electrical heating element 208 disposed within a cover material that is bonded or otherwise affixed to pipe 202. A temperature sensor 210 is disposed to sense the temperature of pipe 202. Each of element 208 and sensor 210 include leadwires that are coupleable to the process device, in accordance with embodiments of the present invention, such that the process device provides a thermal control function. For example, the process device may determine the temperature of impulse pipe 202 using the temperature sensor and apply a selected amount of energy to impulse pipe 202 using heating element 208. FIG. 8 merely shows one example of a thermally controlled impulse pipe. Other embodiments include impulse piping heated or cooled by steam tracing. In these embodiments, the field device provides a thermal control function such that an additional temperature controller is not required.

Thermal control of the process interface provides a number of advantages. First, in applications where the process interface is operated near a freezing temperature of the process medium, providing a controlled source of heat ensures that the passageways from the interface to the pressure sensor module do not freeze. Further, even in applications where the temperature is not near the freezing point of the process medium, heating the process interface is believed to reduce the occurrence of solidification or clogging due to changing temperatures or changes in the state of the fluid itself. Further, in embodiments where the process interface is controllably cooled, such cooling may help keep the temperature of the process medium proximate the interface below critical temperatures such as the boiling point of the process medium.

In embodiments where the field device is able to receive a suitable amount of electrical power, it is conceivable that both the switch/valve and the controller may be incorporated as part of the field device. Further, in embodiments where the controller of the thermal control system is part of the field device, aspects of the thermal control, such as current process interface element temperature, and/or alarm conditions can be conveyed over the process control and measurement loop. Additionally, the controller can receive a new temperature set point for the thermal control system over the process control and measurement and loop, as desired.

It is also expressly contemplated that the process interface element thermal control system may be wholly independent of the field device. Thus, the field device may operate on the relatively low power of a process control and measurement loop (e.g. 4-20 mA) while the thermal control system may employ 120 volt 60 Hz power. Further, in embodiments where the processors of the field device and thermal control system are separate, they may be coupled together to enable communication therebetween. While embodiments of the present invention have been described with respect to a single process interface element, it is expressly contemplated that the thermal control system may be applied to multiple process interface elements with respect to a single field device, or with respect to multiple field devices.

Although the present invention has been described with reference to preferred embodiments, workers skilled in the art will recognize that changes may be made in form and detail without departing from the spirit and scope of the invention.

What is claimed is:

1. A process interface thermal control system for coupling a process variable transmitter to a process, the process interface thermal control system comprising:
 a process interface adapted to couple the process variable transmitter to the process, the process interface having at least one recess to receive a thermal source;
 a temperature sensor coupled to the process interface to provide an indication of the process interface temperature;
 a controller coupled to the temperature sensor and configured to engage the thermal source based upon the indication of the process interface temperature;
 wherein a temperature setpoint of the thermal control system is changeable based upon communication with the process variable transmitter over a bidirectional process communication loop.

2. The system of claim 1, wherein the process interface element is a process flange.

3. The system of claim 1, wherein the process interface element is a process variable transmitter flange.

4. The system of claim 1, wherein the process interface element is a manifold.

5. The system of claim 1, wherein the temperature sensor is mounted within the process interface element.

6. The system of claim 1, wherein the recess is adapted to pass a thermal transfer fluid therethrough.

7. The system of claim 6, wherein the recess is operably coupled to a source of thermal transfer fluid.

8. The system of claim 7, wherein the thermal transfer fluid is steam.

9. The system of claim 7, wherein the thermal transfer fluid is a liquid.

10. The system of claim 7, and further comprising a valve interposed between the source of thermal transfer fluid and the recess, the valve being coupled to the controller and actuating based upon an energization signal from the controller.

11. The system of claim 1, wherein the recess contains an electrical heater therein.

12. The system of claim 11, wherein the electrical heater is a cartridge heater.

13. The system of claim 11, wherein the electrical heater is operably coupled to a source of energy, the heater being selectively energized by the controller.

14. The system of claim 13, and further comprising a switch interposed between the heater and the source of energy, the switch being coupled to the controller to selectively energize the heater based upon an energization signal from the controller.

15. The system of claim 1, wherein the thermal control system is wholly powered by the process variable transmitter.

16. The system of claim 1, wherein the controller is a part of the process variable transmitter.

17. The system of claim 1, wherein the process variable transmitter includes a process variable transmitter controller that is coupled to the controller of the thermal control system.

* * * * *